April 26, 1927.

W. SILBER

BEDPOST LOCK

Filed Jan. 16, 1926

1,626,121

INVENTOR
W. Silber
BY
ATTORNEY

Patented Apr. 26, 1927.

1,626,121

UNITED STATES PATENT OFFICE.

WALTER SILBER, OF BROOKLYN, NEW YORK, ASSIGNOR TO SPECIAL STAMPING AND MANUFACTURING CO., INC., OF NEW YORK, N. Y., A CORPORATION OF NEW YORK.

BEDPOST LOCK.

Application filed January 16, 1926. Serial No. 81,683.

My invention relates to a bedpost lock of the reversible wedge type and the object thereof is to provide a lock which is simple and rigid in construction and can be manufactured economically.

In the appended drawing, Figure 1 is a horizontal section on line 1—1 of Fig. 2.

Figure 1:
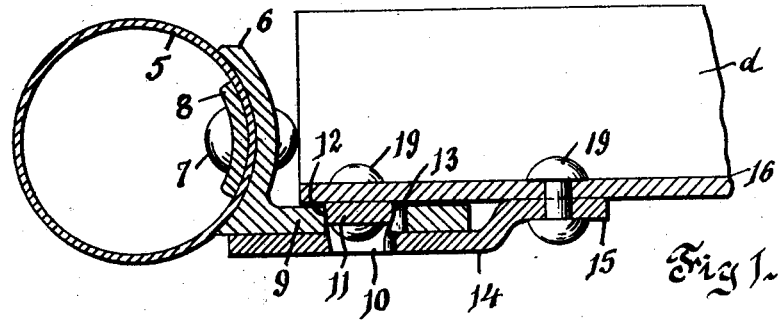

Referring to the drawing, 5 is a tubular bedpost to which a bracket 6 is connected by means of rivets 7. The post 5 at the bracket is reinforced by a liner 8 to increase the rigidity of the bedpost tube 5 at the bracket 6.

Figure 2:
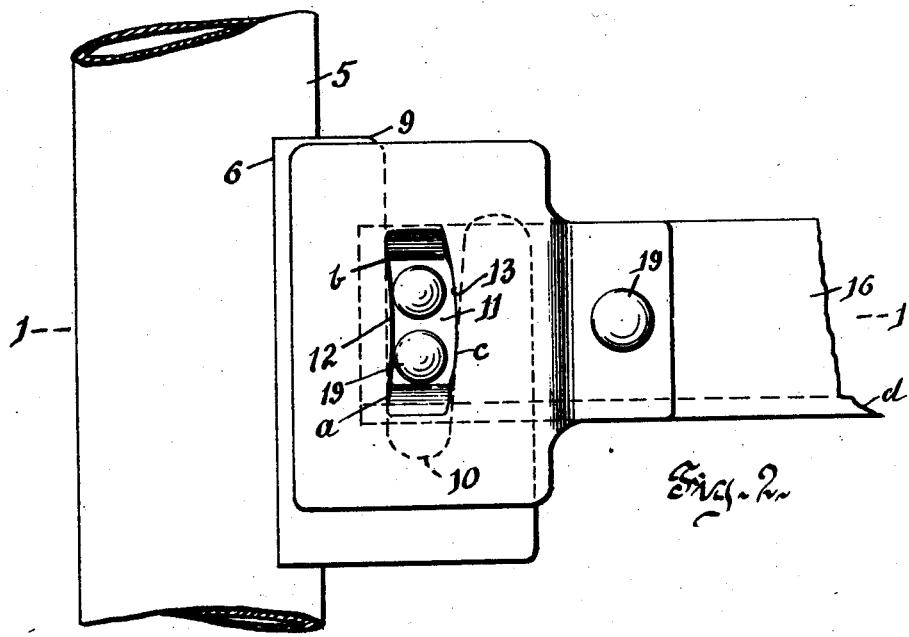
Figure 2 is a vertical elevation of the lock.

The side 9 of the bracket which extends from the tubular post has a tapering slot 10 open at the top as best shown by dotted lines in Figure 2.

A wedge 11 fits into slot 10. The wedge has a concave edge 12 and a convex edge 13, which are the wedging surfaces of the wedge 11. The concave wedge 12 has a greater curvature than the convex edge 13; in consequence the maximum width of the wedge 11 is in the central portion thereof. As shown the wedge 11 is depressed from a plate 14, in stamping the article.

Figure 3:
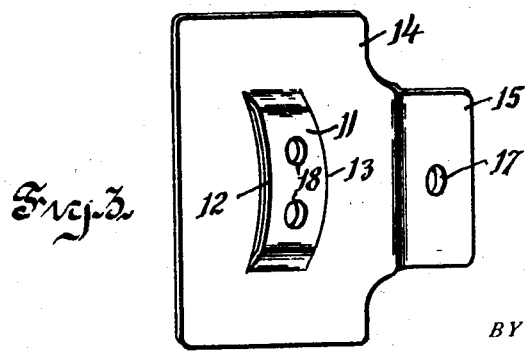
Figure 3 is a perspective view of the wedge and the plate from which it is depressed.

A portion 15 of the plate is off-set as best shown in Figures 1 and 3 to be in a plane with the wedge 11. To this off-set portion 15 and the wedge 11 is secured an angle iron 16 of a bed frame, by rivets 19 engaging suitable openings 17 and 18 in the portion 15 and the wedge respectively. As will be seen from Figure 1, the angle iron and the plate embrace the faces of the side 9 of the bracket 6 when the wedge 11 is engaged into the slot 10 and the bracket.

When a wedge 11 is fitted into the slot 10, it is engaged at the points $a$ and $b$ of the edge 12 and the point $c$ of the edge 13, a three point contact is obtained.

In addition thereto the wedge 11 is so sheared that the edges 12 and 13 taper towards the plate 14. This is obtained by giving a larger clearance to the female shearing edges of the die, than is customary. In consequence, in addition to being wedged along the points $a$, $b$ and $c$, it is also wedged laterally, as will be best seen from Figure 1.

By forming a wedge with a concave edge and a convex edge, it is possible to use the angle iron 16 of the bed frame in two positions, either with the face thereof down as shown in Figure 1 or up, if the lock disclosed in Figure 1 would be moved to a bracket on the right side thereof. In other words, this structure gives a reversible bedpost lock.

I claim:

A bedpost lock comprising a bracket adapted to be secured to the post and having a portion thereof extending from the post, said extended portion having a tapered slot, a stamping in shape of a plate having a wedge depressed to one side thereof for engaging the slot and an off-set portion to the same side as the wedge, said wedge presenting a concave and a convex edge for engaging the slot, these edges tapering toward the plate, the curvature of the concave edge being greater than that of the convex edge, said wedge and off-set portion having means for securing thereto an angle iron on a bed frame.

WALTER SILBER.